US006414586B1

United States Patent
Yoshizawa

(12) United States Patent
(10) Patent No.: US 6,414,586 B1
(45) Date of Patent: Jul. 2, 2002

(54) KEYLESS ENTRY SYSTEM

(75) Inventor: Takashi Yoshizawa, Sagamihara (JP)

(73) Assignee: Nissan Motor Co., Ltd., Yokohama (JP)

(*) Notice: Subject to any disclaimer, the term of this patent is extended or adjusted under 35 U.S.C. 154(b) by 1012 days.

(21) Appl. No.: 08/614,767

(22) Filed: Mar. 13, 1996

(30) Foreign Application Priority Data

Mar. 13, 1995 (JP) .............................................. 7-052967

(51) Int. Cl.$^7$ ................................................ G08C 19/00
(52) U.S. Cl. ........................ 340/5.2; 340/5.6; 340/5.64; 340/5.72; 307/10.2; 307/10.5
(58) Field of Search ................................ 307/9.1, 10.1, 307/10.5, 10.2, 10.3, 10.4, 10.6; 340/825.31, 825.6; 180/287

(56) References Cited

U.S. PATENT DOCUMENTS 4,868,409 A * 9/1989 Tanaka et al. ............. 307/10.5
4,973,958 A * 11/1990 Hirano et al. ........... 340/825.69

* cited by examiner

Primary Examiner—Michael Horabik
(74) Attorney, Agent, or Firm—Foley & Lardner

(57) ABSTRACT

A keyless entry system for use with a key for operation within the key receptacle to start an engine. The key is arranged to transmit a first ID code specified therefor when the key is operated within the key receptacle to start the engine. The transmitted first ID code is compared with a second ID code registered in an antitheft control unit. The engine is permitted to start if the transmitted first ID code is identical with the registered second ID code. A mobile transmitter is used for transmitting a third ID code specified therefor along with a command for vehicle door lock/unlock remote control. The transmitted third ID code is compared with a fourth ID code registered in a keyless entry control unit. The remote control specified by the transmitted command is permitted if the transmitted third ID code is identical with the registered fourth ID code. The keyless entry control unit registers the fourth ID code therein based on the transmitted first ID code.

10 Claims, 5 Drawing Sheets

ID CODE INFORMATION

ID CODE INFORMATION    FUNCTION CODE
                        INFORMATION

KEYLESS ENTRY SYSTEM

BACKGROUND OF THE INVENTION

This invention relates to a keyless entry system for vehicle door lock or unlock remote control.

Keyless entry systems have been used to vehicle door lock or unlock control at a position remote from the vehicle. Such a conventional keyless entry system is used with a mobile transmitter of the type having door lock/unlock buttons for transmitting a command causing the vehicle doors to be locked or unlocked when depressed at a position remote from the vehicle. The keyless entry system has a keyless entry control unit which permits the remote control only when the ID code transmitted along with the command from the mobile transmitter is identical with the ID code registered therein.

In order to register the ID code in the keyless entry control unit, it is required to depress the lock/unlock buttons after the key is taken out and put in the key receptacle several times with the vehicle doors being locked to place the keyless entry control unit in its registration mode. However, the mobile transmitter is arranged to produce a strong electro-magnetic wave which may cause mistaken ID code registration for another vehicle. This is true particularly when ID code registrations are made for a number of vehicles in a factory.

SUMMARY OF THE INVENTION

It is a main object of the invention to provide an improved keyless entry system which is free from mistaken ID code registration which may be caused by an ID code transmitted for another vehicle.

Another object of the invention is to provide an improved keyless entry system which can register an ID code specified for the vehicle through simple operation.

There is provided, in accordance with the invention, a keyless entry system for use with an automotive vehicle having an internal combustion engine and a key receptacle. The keyless entry system comprises a key for operation within the key receptacle to start the engine. The key includes means for transmitting a first ID code specified therefor when the key is operated within the key receptacle to start the engine. The keyless entry control system also comprises antitheft control means for comparing the transmitted first ID code with a second ID code registered therein to permit the engine to start when the transmitted first ID code is identical with the registered second ID code, a mobile transmitter for transmitting a third ID code specified therefor along with a command for vehicle door lock/unlock remote control, and keyless entry control means for comparing the transmitted third ID code with a fourth ID code registered therein to permit the remote control specified by the transmitted command when the transmitted third ID code is identical with the registered fourth ID code. The keyless entry control means includes means for registering the fourth ID code therein based on the transmitted first ID code.

In another aspect of the invention, the keyless entry system comprises a key for operation within the key receptacle to start the engine. The key includes means for transmitting a first ID code specified therefor when the key is operated within the key receptacle to start the engine, and means for transmitting the first ID code along with a command for vehicle door lock/unlock remote control. The keyless entry system also comprises antitheft control means for comparing the transmitted first ID code with a second ID code registered therein to permit the engine to start when the transmitted first ID code is identical with the registered second ID code, and keyless entry control means for comparing the transmitted first ID code with a third ID code registered therein to permit the remote control specified by the transmitted command when the transmitted first ID code is identical with the registered third ID code which is the same as the second ID code. The keyless entry control means includes means for registering the third ID code therein based on the transmitted first ID code.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
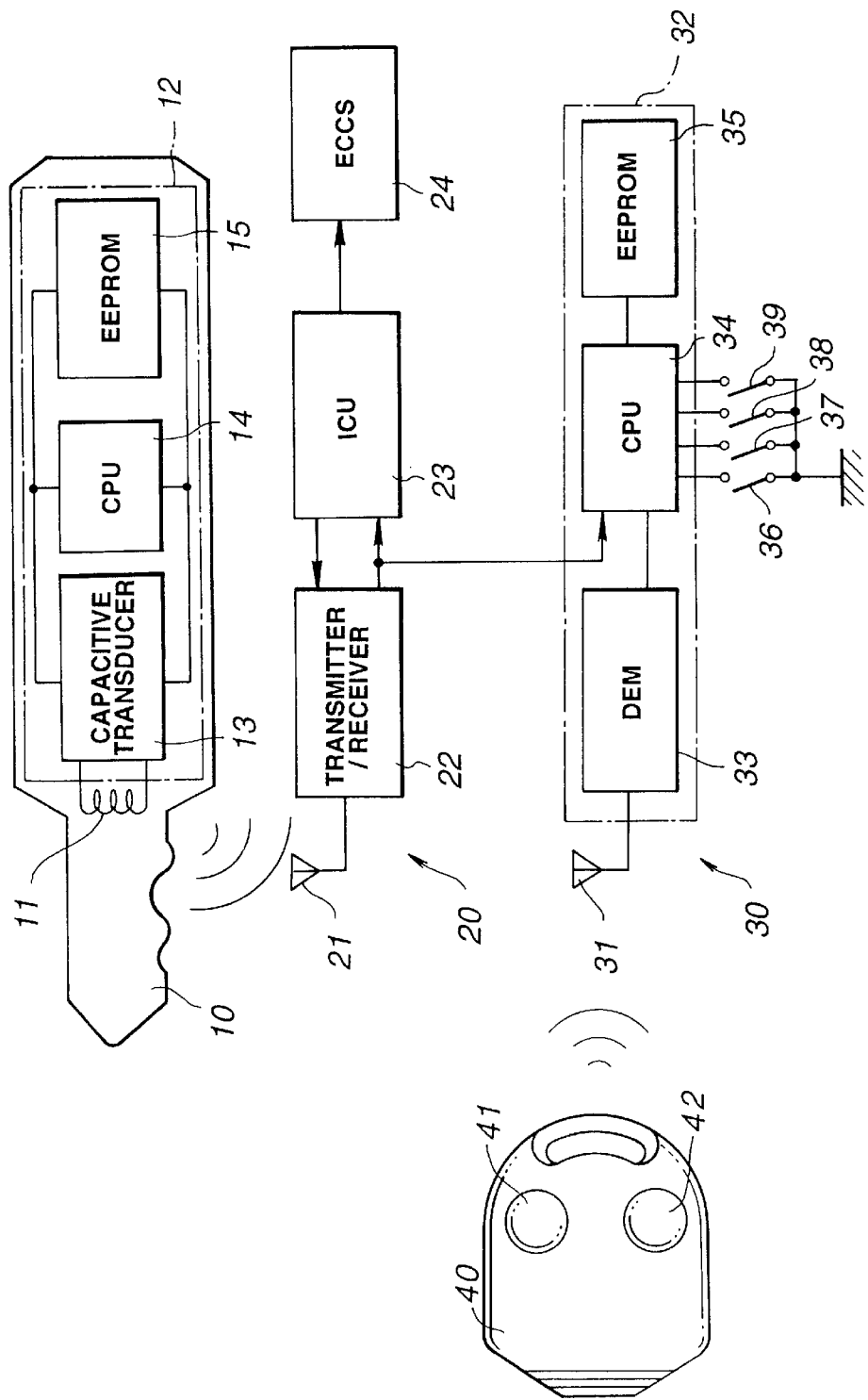
FIG. 1 is a schematic diagram showing a first embodiment of a keyless entry system made in accordance with the invention.

With reference to the drawings and in particular to FIG. 1, there is shown one embodiment of a keyless entry system of the invention. This invention is intended for use with an automotive vehicle having a steering column key receptacle in which a key is placed to start the engine. The keyless entry system includes a transponder module 12 associated with an antenna 11 built in the key 10 along with the transponder module 12. The transponder module 12 includes a capacitive transducer 13, a micro-processor (CPU) 14 and a memory (EEPROM) 15. The capacitive transducer 13 is of the type having a capacitor connected to be charged by the signal fed from the antenna 11. The memory 15 has an ID code registered therein. The micro-processor 14 reads the ID code from the memory 15 and transmits the read ID code through the capacitive transducer 13 to the antenna 11.

The keyless entry system also includes an antitheft control unit 20 comprised of an antenna 21, a transmitter/receiver unit 22, an immobilizer control unit (ICU) 23 and an engine control unit (ECCS) 24. The signal transmitted from the key 10 to the antenna 21 is received by the transmitter/receiver unit 22 which converts it into an ID code. The immobilizer control unit 23 compares the received ID code with the ID code stored therein. If these two ID codes are identical, the immobilizer control unit 23 instructs the engine control unit 24 to permit the engine to start.

The keyless entry system also includes a keyless entry control unit 30 having an antenna 31 and a control module 32 associated with an antenna 31. The control module 32 includes a demodulator (DEM) 33, a micro-processor (CPU) 34 and a memory (EEPROM) 35. The demodulator 33 receives a signal transmitted from a mobile transmitter 40 to the antenna 31. The mobile transmitter 40 has a door lock button 41 and a door unlock button 42. The door lock button 41 is depressed to produce a signal which includes a command causing the vehicle doors to be locked along with an ID code specified for the mobile transmitter 40. The door unlock button 42 is depressed to produce a signal which includes a command causing the vehicle doors to be unlocked along with the ID code specified for the mobile transmitter 40. The demodulator 33 demodulates the received signal into a corresponding ID code and command. The demodulated ID code is fed from the demodulator 33 to the micro-processor 34 which stores the received ID code into the memory 35. The ID code registered in the memory 35 may be the same as the ID code registered in the immobilizer control unit 23 of the antitheft control unit 20. The demodulated command is fed from the demodulator 33 to the micro-processor 34 which locks or unlocks the vehicle doors. For this purpose, the micro-processor 34 is connected to various switches including an IGN-ON switch 36, a door lock switch 37, a door unlock switch 38 and a door switch 39. The IGN-ON switch 36 is closed to connect the micro-processor 34 to the ground when the key 10 is placed in the IGN-ON position within the steering column key receptacle. The door lock switch 37 is closed to connect the micro-processor 34 to the ground when the vehicle doors are locked. The door unlock switch 38 is closed to connect the micro-processor 34 to the ground when the vehicle doors are unlocked. The door switch 39 is closed to connect the micro-processor 34 to the ground when the vehicle doors are closed. The micro-processor 34 is connected to receive the ID code information from the transmitter/receiver unit 22 of the antitheft control unit 20.

Description will be made to the antitheft control. When the key 10 is placed in the steering column key receptacle, a signal is transmitted at a predetermined frequency to the antenna 21. The transmitted signal is received through the antenna 11 and fed to the capacitive transducer 13. The capacitive transducer 13 rectifies the received signal and charges the capacitor with the rectified signal. The capacitive transducer 13 converts the charge accumulated in the capacitor into a voltage. This voltage is applied to the power terminals of the micro-processor 14 and the memory 15. The micro-processor 14 reads the ID code from the memory 12 and transmits it through the capacitive converter 13 to the antenna 11. The transmitted ID code is received through the antenna 21 by the transmitter/receiver unit 22 which demodulates the received signal. The demodulated signal is fed to the immobilizer control unit 23 which compares the received ID code with the ID code stored therein. If these two ID codes are identical, it instructs the engine control unit 24 to permit the engine to start.

Figure 2:
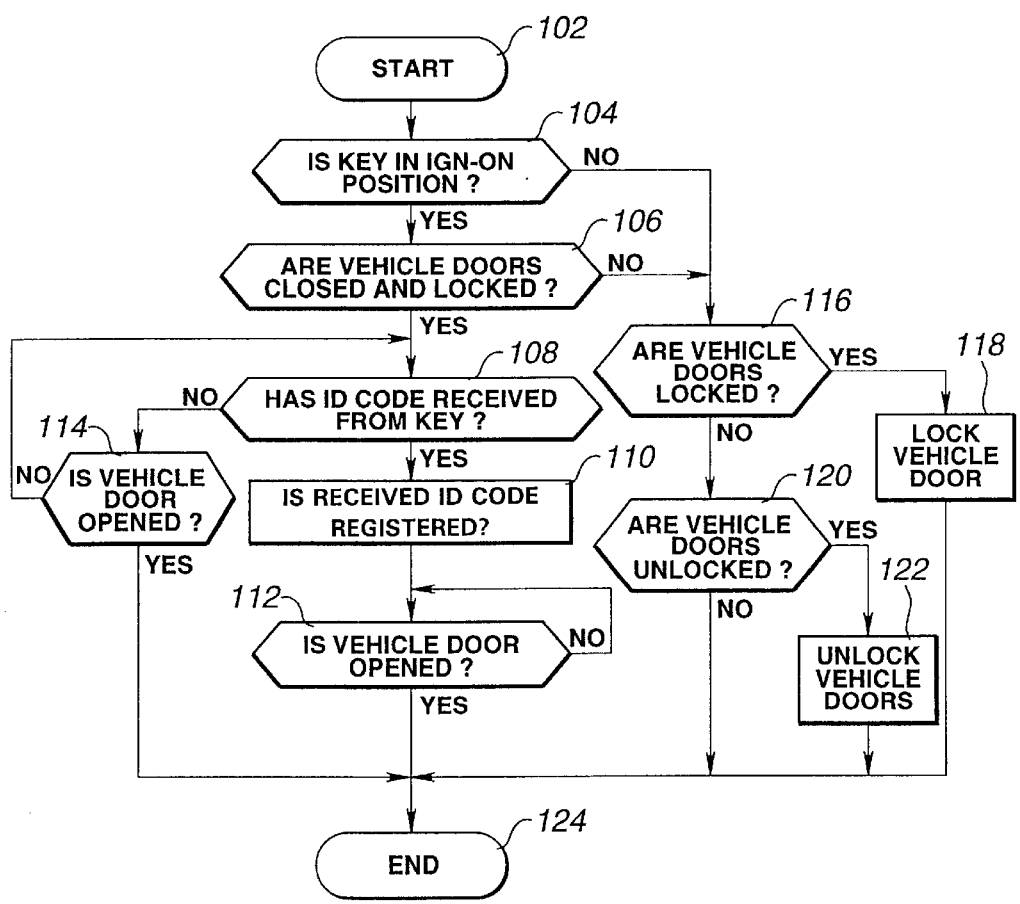
FIG. 2 is a flow diagram showing the programming of the digital computer as it is used in the first embodiment of the invention for ID code registration.

FIG. 2 is a flow diagram illustrating the programming of the digital computer as it is used in the micro-processor 34 for keyless entry control and also for ID code registration control. The computer program is entered at the point 102. At the point 104 in the program, a determination is made as to whether or not the key 10 is in the IGN-ON position within the steering column key receptacle. This determination is made based on the position of the IGN-ON switch 36. If the answer to this question is "YES", then the program proceeds to another determination step at the point 106. This determination is as to whether or not the vehicle doors are closed and locked. This determination is made based on the positions of the door switch 39 and the door lock switch 37. If the answer to this question is "YES", then the program proceeds to the point 108 to initiate the ID code registration. Otherwise, the program proceeds to the point 116.

At the point 108 in the program, a determination is made as to whether or not the ID code transmitted from the key 10 has been received by the antitheft control unit 20, that is, the ID code transmitted through the antenna 21 to the transmitter/receiver unit 22 has been inputted into the micro-processor 34. If the answer to this question is "YES", then the program proceeds to the point 110 where the received ID code is stored in the memory 35. Upon completion of this ID code registration, the program proceeds to a determination step at the point 112. This determination is as to whether or not either of the vehicle doors is opened. If the answer to this question is "YES", then the program proceeds to the end point 124. Otherwise, the program is returned to the point 112.

If the answer to the question inputted at the point 108 is "NO", then the program proceeds to another determination step at the point 114. This determination is as to whether or not either of the vehicle doors is opened. If the answer to this question is "YES", then the program proceeds to the end point 124. Otherwise, the program is returned to the point 108.

If the answer to the question inputted at the point 104 is "NO", then the program proceeds to a determination step at the point 116. This determination is as to whether or not the vehicle doors are locked and it is made based on the position of the door lock switch 37. If the answer to this question is "YES", then the program proceeds to the point 118 where a command is produced to instruct the door lock actuator (not shown) to lock the vehicle doors and then to the end point 124. Otherwise, the program proceeds to another determination step at the point 120. This determination is as to whether or not the vehicle doors are unlocked and it is made based on the position of the door unlock switch 38. If the answer to this question is "YES", then the program proceeds to the point 122 where a command is produced to instruct the door lock actuator to unlock the vehicle doors. Otherwise, the program proceeds to the end point 124.

The new ID code registered in the keyless entry control module 32 is the ID code received through the antenna 21 associated with the antitheft control unit 20 rather than the ID code received through the antenna 31 associated with the keyless entry control unit 30. That is, the new ID code can be registered without the operation of the mobile transmitter 40. Therefore, the keyless entry system is free from mistaken ID code registration caused by the ID code transmitted from a mobile transmitter for another vehicle. It is also possible to register the ID code in the keyless entry control unit 32 simply by placing the key 10 having an ID code identical to the ID code of the mobile transmitter 40 into the IGN-ON position within the steering column key receptacle.

While the first embodiment has been described in connection with a keyless entry system arranged for vehicle door locked/unlocked condition remote control with the mobile transmitter 40, it is to be understood that the system may be arranged to change-over the electric power to electric devices such as room lamps, air conditioners and the like. While the first embodiment has been described in connection with a keyless entry system utilizing radio-electric links formed between the mobile transmitter 40 and the keyless entry control unit 30 and also between the key 10 and the antitheft control unit 20, it is to be understood that the system may be arranged to utilize infrared-ray links formed between the mobile transmitter 40 and the keyless entry control unit 30 and between the key 10 and the antitheft control unit 20.

Figure 3:
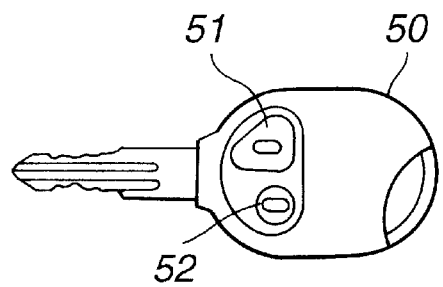
FIG. 3 is a plan view of the key used in a second embodiment of the keyless entry system of the invention.
Figure 4:
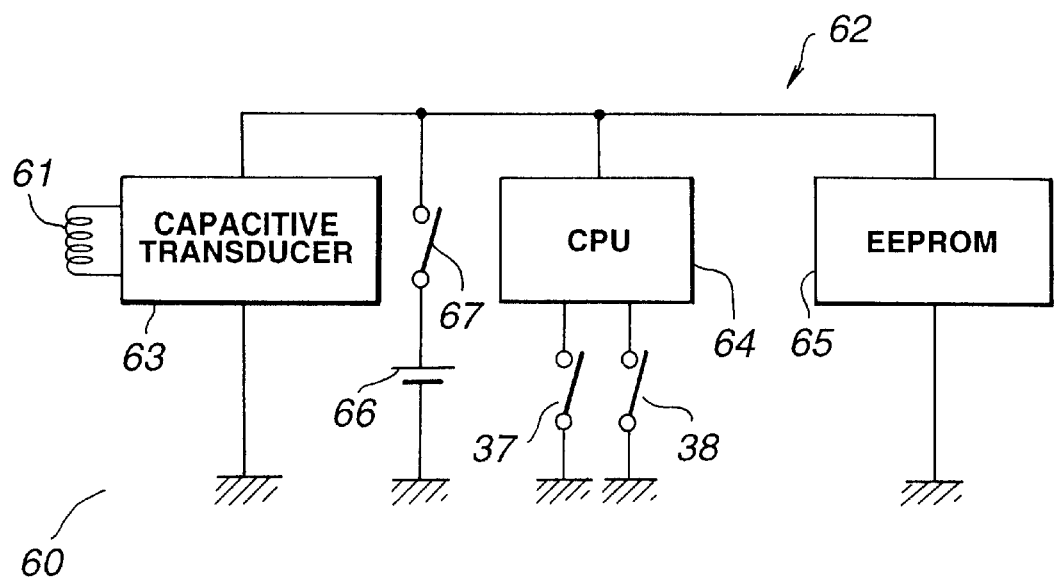
FIG. 4 is a block diagram showing the transponder module built in the key of FIG. 3.

Referring to FIGS. 3 and 4, there is shown a second embodiment of the keyless entry system of the invention.

Figure 5A:
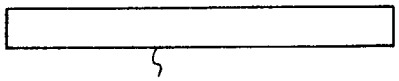
FIGS. 5A and 5B are diagrams used in explaining the signals transmitted from the key for different key operation modes.
Figure 5B:
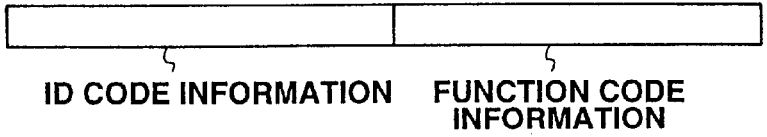

This embodiment is substantially the same as the first embodiment described in connection with FIG. 1 except for the arrangement of the key for insertion in the steering column key receptacle. In this embodiment, the key 50 has a lock button 51 and an unlock button 52, as shown in FIG. 3. The key 50 has a transponder module 62 associated with an antenna 61 built in the key 50 along with the transponder module 62. The transponder module 62 includes a capacitive transducer 63, a micro-processor (CPU) 64 and a memory (EEPROM) 65. The capacitive transducer 63 is of the type having a capacitor connected to be charged by the signal fed from the antenna 61. The memory 65 has an ID code registered therein. The micro-processor 64 reads the ID code from the memory 65 and transmits the read ID code through the capacitive transducer 63 to the antenna 61. The micro-processor 64 is connected to door lock and unlock switches 37 and 38. The door lock switch 37 is closed to connect the micro-processor 64 to the ground when the vehicle doors are locked. The door unlock switch 38 is closed to connect the micro-processor 64 to the ground when the vehicle doors are unlocked. A battery 66 is connected at its positive terminal through a power switch 67 to the capacitive transducer 63, the micro-processor 64 and the memory 65. The negative terminal of the battery 66 is connected to the ground. The power switch 67 is closed when one of the door lock and unlock switches 37 and 38 is closed. When the power switch 67 is closed, power is supplied to transmit a signal from the mobile key 50 to the keyless entry control unit 30. The transmitted signal includes ID code information, as shown in FIG. 5A, when the key 50 is placed in the IGN-ON position within the steering column key receptacle, and ID code information along with function code information, as shown in FIG. 5B, when the lock or unlock button 51 or 52 is depressed. The function code information includes a command causing the vehicle doors to be locked or unlocked. In the second embodiment, the ID code registered in the memory 35 of the keyless entry control unit 30 is the same as the ID code registered in the immobilizer control unit 23 of the antitheft control unit 20.

Figure 6:
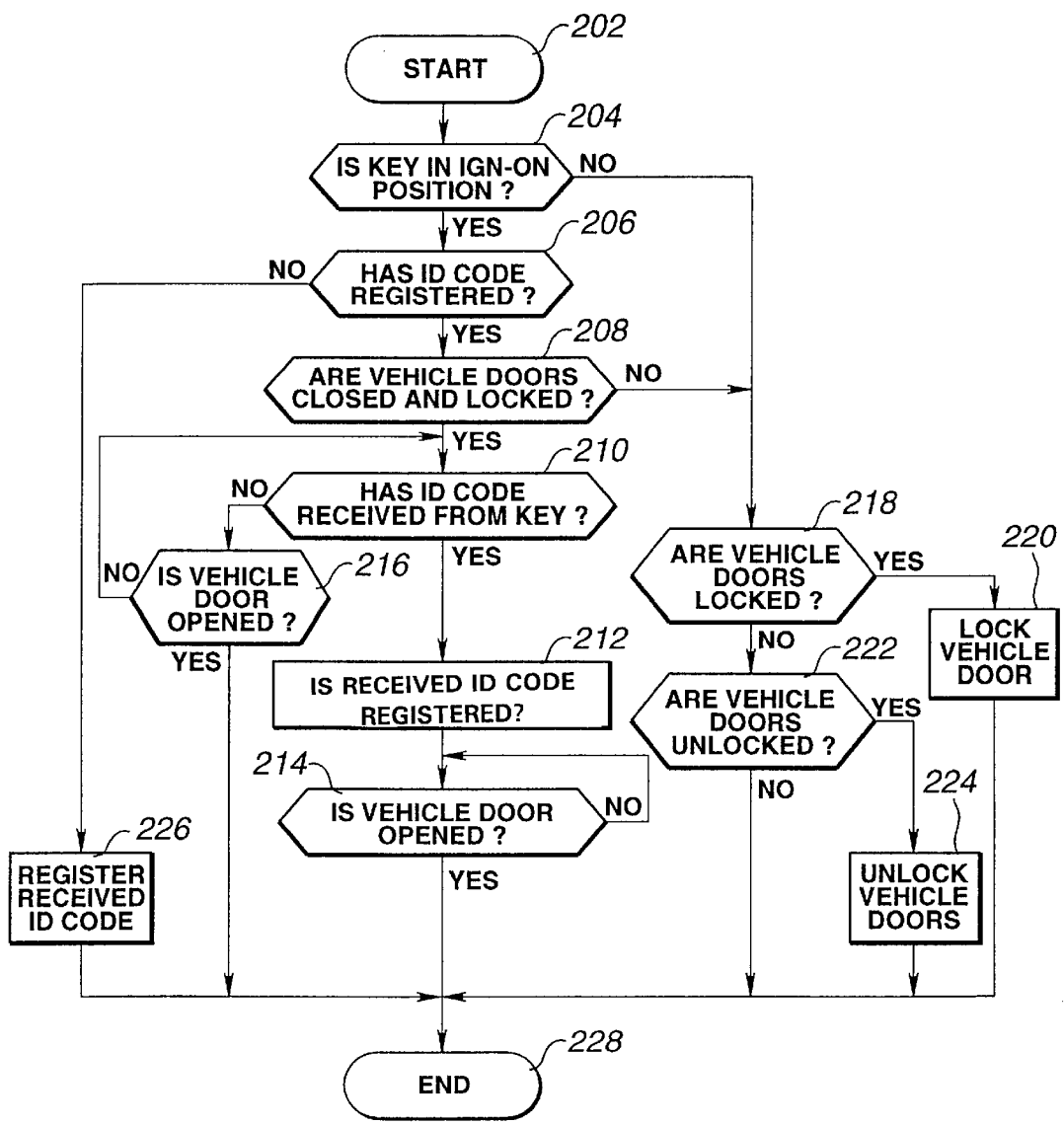
FIG. 6 is a flow diagram showing the programming of the digital computer as it is used in the second embodiment of the invention for ID code registration.

FIG. 6 is a flow diagram illustrating the programming of the digital computer as it is used in the micro-processor 34 for keyless entry control and also for ID code registration control. The computer program is entered at the point 202. At the point 204 in the program, a determination is made as to whether or not the key 50 is in the IGN-ON position within the steering column key receptacle. This determination is made based on the position of the IGN-ON switch 36. If the answer to this question is "YES", then the program proceeds to another determination step at the point 206. This determination is as to whether or not the ID code has been registered in the memory 35. If the answer to this question is "YES", then the program proceeds to another determination step at the point 208. This determination is as to whether or not the vehicle doors are closed and locked. This determination is made based on the positions of the door switch 39 and the door lock switch 37. If the answer to this question is "YES", then the program proceeds to the point 210 to initiate the ID code registration. Otherwise, the program proceeds to the point 218.

At the point 210 in the program, a determination is made as to whether or not the ID code transmitted from the key 50 has been received by the antitheft control unit 20, that is, the ID code transmitted through the antenna 21 to the transmitter/receiver unit 22 has been inputted into the micro-processor 34. If the answer to this question is "YES", then the program proceeds to the point 212 where the received ID code is stored in the memory 35. Upon completion of this ID code registration, the program proceeds to a determination step at the point 214. This determination is as to whether or not either of the vehicle doors is opened. If the answer to this question is "YES", then the program proceeds to the end point 228. Otherwise, the program is returned to the point 214.

If the answer to the question inputted at the point 210 is "NO", then the program proceeds to another determination step at the point 216. This determination is as to whether or not either of the vehicle doors is opened. If the answer to this question is "YES", then the program proceeds to the end point 228. Otherwise, the program is returned to the point 210.

If the answer to the question inputted at the point 204 is "NO", then the program proceeds to a determination step at the point 218. This determination is as to whether or not the vehicle doors are locked and it is made based on the position of the door lock switch 37. If the answer to this question is "YES", then the program proceeds to the point 220 where a command is produced to instruct the door lock actuator (not shown) to lock the vehicle doors and then to the end point 228. Otherwise, the program proceeds to another determination step at the point 222. This determination is as to whether or not the vehicle doors are unlocked and it is made based on the position of the door unlock switch 35. If the answer to this question is "YES", then the program proceeds to the point 224 where a command is produced to instruct the door lock actuator to unlock the vehicle doors. Otherwise, the program proceeds to the end point 228.

If the answer to the question inputted at the point 206 is "NO", then the program proceeds to the point 226 where the ID code received by the antitheft control unit 20 is registered into the memory 35. Following this, the program proceeds to the end point 228.

If the ID code has not been registered, the ID code transmitted from the key 50 is registered in the memory 35 at the first time the key 30 is placed in the IGN-ON position within the steering column key receptacle. In this embodiment, the mobile transmitter 40 used in the first embodiment of the keyless entry system of the invention is not required. The operations required for the ID code registration can be simplified further. With the battery 66 built in the key 50, a stronger electromagnetic wave can be produced to transmit the ID code. It is, therefore, possible to avoid erroneous operations resulting from noise.

While the second embodiment has been described in connection with a keyless entry system arranged for vehicle door locked/unlocked condition remote control with the key 50, it is to be understood that the system may be arranged to change-over the electric power to electric devices such as room lamps, air conditioners and the like. While the second embodiment has been described in connection with a keyless entry system utilizing radio-electric links formed between the key 50 and the keyless entry control unit 30 and between the key 50 and the antitheft control unit 20, it is to be understood that the system may be arranged to utilize infrared-ray links may be formed between the key 50 and the keyless entry control unit 30 and between the key 50 and the antitheft control unit 20.

What is claimed is:
1. A keyless entry system for use with an automotive vehicle having an internal combustion engine and a key receptacle, comprising:
    a key for operation within the key receptacle to start the engine, the key including means for transmitting a code signal including a first ID code specified therefor when the key is operated within the key receptacle to start the engine;

a receiver for receiving the code signal transmitted from the key;

antitheft control means for comparing the first ID code of the received code signal with a second ID code registered therein to permit the engine to start when the received first ID code is identical with the registered second ID code;

a mobile transmitter for transmitting a third ID code specified therefor along with a command for vehicle door lock/unlock remote control;

means associated with the receiver for registering a fourth ID code based on the first ID code of the code signal received by the receiver; and keyless entry control means for comparing the transmitted third ID code with the fourth ID code registered therein to permit the remote control specified by the transmitted command when the transmitted third ID code is identical with the registered fourth ID code.

2. The keyless entry system as claimed in claim 1, wherein the second and fourth ID codes are identical.

3. The keyless entry system as claimed in claim 1, wherein the first ID code is transmitted with a weak electromagnetic wave for reception in a first range and the third ID code is transmitted with a strong electromagnetic wave for reception in a second range wider than the first range.

4. A keyless entry system for use with an automotive vehicle having an internal combustion engine and a key receptacle, comprising:

a key for operation within the key receptacle to start the engine, the key including means for transmitting a code signal including a first ID code specified therefor when the key is operated within the key receptacle to start the engine, and means for transmitting the first ID code along with a command for vehicle door lock/unlock remote control;

a receiver for receiving the code signal transmitted from the key;

antitheft control means for comparing the first ID code of the received code signal with a second ID code registered therein to permit the engine to start when the received first ID code is identical with the registered second ID code;

means associated with the receiver for registering a third ID code based on the first ID code of the code signal received by the receiver; and keyless entry control means for comparing the transmitted first ID code with the third ID code registered therein to permit the remote control specified by the transmitted command when the transmitted first ID code is identical with the registered third ID code.

5. The keyless entry system as claimed in claim 4, wherein the key includes a capacitive transducer having a capacitor charged with an electromagnetic wave transmitted from the antitheft control means, a battery, and means for transmitting the first ID code with a power from the charged capacitor when only the first ID code is transmitted and with a power from the battery when the first ID code is transmitted along with the command.

6. A keyless entry system for use with an automotive vehicle, comprising:

an antitheft transmitter to transmit a keyless entry ID code;

an antitheft receiver disposed in the vehicle to receive the keyless entry ID code transmitted by the antitheft transmitter;

a keyless entry transmitter to transmit a keyless entry ID code;

a keyless entry receiver to receive the keyless entry ID code transmitted by the keyless entry transmitter;

a keyless entry memory disposed in the vehicle; and a keyless entry controller connected to the antitheft receiver and storing the keyless entry ID code in the keyless entry memory when the antitheft receiver receives the keyless entry ID code, the keyless entry controller locking and unlocking a door of the vehicle when the keyless entry ID code received by the keyless entry receiver is identical to the keyless entry ID code stored in the keyless entry memory.

7. The keyless entry system as claimed in claim 6, wherein the keyless entry controller stores the keyless entry ID code when the keyless entry ID code is absent in the keyless entry memory.

8. The keyless entry system as claimed in claim 6, wherein the antitheft transmitter transmits the keyless entry ID code with a weaker signal than the keyless entry transmitter transmits the keyless entry ID code.

9. The keyless entry system as claimed in claim 6, further comprising:

a key receptacle disposed in the vehicle;

a key operated within the key receptacle to start an engine of the vehicle; and an antitheft controller to permit starting of the engine when the antitheft receiver receives an authorized antitheft ID code, wherein the antitheft receiver is disposed in the key receptacle, and wherein the antitheft transmitter is disposed in the key and transmits the keyless entry ID code when the key is operated in order to start the engine.

10. The keyless entry system as claimed in claim 9, wherein the antitheft receiver has an antenna to transmit a trigger signal to the antitheft transmitter when the key is operated in order to start the engine, and wherein the antitheft transmitter transmits the keyless entry ID code in response to the trigger signal.

\* \* \* \* \*